US 012312187B2

(12) United States Patent
Scott (10) Patent No.: US 12,312,187 B2
(45) Date of Patent: May 27, 2025

(54) ROBOTIC SYSTEM FOR STACKING AND DE-STACKING

(71) Applicant: Intelligrated Headquarters, LLC, Mason, OH (US)

(72) Inventor: Darius Scott, Baltimore, MD (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 779 days.

(21) Appl. No.: 17/462,611

(22) Filed: Aug. 31, 2021

(65) Prior Publication Data

US 2023/0066910 A1    Mar. 2, 2023

(51) Int. Cl.
*B65G 57/03*    (2006.01)

(52) U.S. Cl.
CPC ...... *B65G 57/03* (2013.01); *B65G 2201/0258* (2013.01)

(58) Field of Classification Search
CPC ........... B65G 57/03; B65G 2201/0258; B65G 41/008; B65G 57/301; B65G 57/303; B65G 59/106
See application file for complete search history.

(56) References Cited

U.S. PATENT DOCUMENTS

| | | | | |
|---|---|---|---|---|
| 3,752,261 A | * | 8/1973 | Bushnell, Jr. | E04G 1/22 182/115 |
| 2015/0274440 A1 | * | 10/2015 | Strass | B65G 49/067 414/798.2 |
| 2017/0334696 A1 | * | 11/2017 | Otto | B66F 9/18 |
| 2017/0357270 A1 | * | 12/2017 | Russell | G06V 20/10 |
| 2019/0329978 A1 | * | 10/2019 | Li | G05D 1/0295 |
| 2019/0337733 A1 | * | 11/2019 | Wehner | B65G 47/90 |
| 2021/0261337 A1 | * | 8/2021 | Schedlbauer | G06Q 10/08 |
| 2021/0323767 A1 | * | 10/2021 | Liu | B65G 65/00 |
| 2021/0356973 A1 | * | 11/2021 | Xu | F24S 40/20 |
| 2023/0142253 A1 | * | 5/2023 | Heggebø | B66C 19/00 700/218 |
| 2023/0192404 A1 | * | 6/2023 | Sharp | B65G 1/0464 700/218 |
| 2024/0025058 A1 | * | 1/2024 | Johnson | B25J 18/025 |

* cited by examiner

*Primary Examiner* — Michael Collins
(74) *Attorney, Agent, or Firm* — ALSTON & BIRD LLP (57) ABSTRACT

A method of operation of a mobile unit is described here. The method includes receiving a first signal to create a stack of totes on a conveying platform. Further, the method comprises receiving a second signal to lift the stack of totes in a vertical upward direction relative to the conveying platform. The method further comprises receiving a third signal to dispense a first tote from the stack of totes to a first location. The first tote is held at the conveying platform by a set of grippers of the mobile unit. Further, the method comprises receiving a fourth signal to travel to a second location to drop a second tote from the stack of totes. In some examples, the second tote corresponds to a current lowermost tote among the stack of totes and is held at the conveying platform by the set of grippers.

17 Claims, 6 Drawing Sheets

ROBOTIC SYSTEM FOR STACKING AND DE-STACKING

TECHNOLOGICAL FIELD

Example embodiments described herein relate generally to systems, methods, and apparatuses for performing stacking and de-stacking of containers in a warehouse environment.

BACKGROUND

Generally, in material handling sites like, but not limited to, distribution centers, warehouses, inventories, or shipping centers, various machines such as, conveyors, palletizers, robotic arms, truck loaders/unloaders, AGVs (Automated Guided Vehicle) and/or AMRs (Autonomous Mobile Robot) are used for performing various operations. For instance, the material handling sites often require collection of empty totes and replenishment of the empty totes. Thus, manual replenishment of totes can be time consuming and laborious. Typically, in the material handling environment, a stationary stacker/de-stacker machine can be used for tote collection and tote distribution. However, using a conveyor belt or other conveying means to bring the empty totes to the stationary stacker/de-stacker machine can be practically difficult and costly.

SUMMARY

The following presents a simplified summary to provide a basic understanding of some aspects of embodiments described herein. This summary is not an extensive overview and is intended to neither identify key or critical elements nor delineate the scope of such elements. Its purpose is to present some concepts of the described features in a simplified form as a prelude to the more detailed description that is presented later.

An apparatus is described in accordance with some example embodiments. The apparatus comprising a telescopic platform, a lifting apparatus, and a set of grippers. The telescopic platform comprising a flat surface to support a plurality of totes positioned thereon. The lifting apparatus configured to lift the plurality of totes in a vertical direction relative to the flat surface of the telescopic platform. The set of grippers configured to grip and hold at least one tote among the plurality of totes on the flat surface.

A mobile unit is described in accordance with another example embodiments. The mobile unit comprises at least one processor and at least one non-transitory memory comprising a computer program code The at least one non-transitory memory and the computer program code configured to, with the at least one processor, cause the mobile unit to: receive a first signal to create a stack of totes on a conveying platform; receive a second signal to lift the stack of totes in a vertical upward direction relative to the conveying platform; receive a third signal to dispense a first tote from the stack of totes to a first location, wherein the first tote is a lowermost tote among the stack of totes and is held at the conveying platform by a set of grippers of the mobile unit; and receive a fourth signal to travel to a second location to drop a second tote from the stack of totes, wherein the second tote corresponds to a current lowermost tote among the stack of totes and is held at the conveying platform by the set of grippers, and wherein the first location is different from the second location.

According to some example embodiments, a method for controlling a mobile unit includes transmitting a first instruction to a telescopic platform of the mobile unit when operating in a first mode, to extend telescopically outward along a conveying direction to pick a first tote so as to position the first tote on a flat surface of the telescopic platform. Further, the method includes directing a lifting apparatus of the mobile unit to lift the first tote in a vertical upward direction. Furthermore, the method includes transmitting a second instruction to the telescopic platform to extend telescopically outward along the conveying direction to pick a second tote and position the second tote on the flat surface. The method further includes creating a stack of the first tote and the second tote on the flat surface. Furthermore, the method includes transmitting a third instruction to the lifting apparatus of the mobile unit when operating in a second mode, to lift the first tote that is an uppermost tote in the stack. Furthermore, the method includes transmitting a fourth instruction to the the telescopic platform to extend telescopically outward along the conveying direction to dispense the second tote out from the telescopic platform.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The accompanying drawings illustrate embodiments of the invention, and, together with the specification, including the general description above and the detailed description which follows, serve to explain the features of the present invention.

DETAILED DESCRIPTION

The present invention now will be described more fully hereinafter with reference to the accompanying drawings in which some but not all embodiments of the inventions are shown. Indeed, these inventions can be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," "outside," "inside,", "upward", "downward", "vertical", "horizontal", etc. are used for explanatory purposes in the examples provided below to describe the relative position of certain devices or portions of devices. Terminology used in this patent is not meant to be limiting insofar as devices described herein, or portions thereof, can be attached or utilized in other orientations.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase can be included in at least one embodiment of the present invention, and can be included in more than one embodiment of the present invention (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

The terms "about" or "approximately" or the like, when used with a number, can mean that specific number, or alternatively, a range in proximity to the specific number, as understood by persons of skill in the art field.

If the specification states a component or feature "can," "can," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

As used herein, the term "transmitter" refers to any component that can generate radio waves for communication purposes while a "receiver" is used to generally refer to any component that can receive radio waves and convert the information into useable form. A "transceiver" generally refers to a component that can both generate radio waves and receive radio waves and is thus contemplated when either a transmitter or a receiver is discussed.

The term "processor" is used herein to refer to any programmable microprocessor, microcomputer or multiple processor chip or chips that can be configured by software instructions (applications) to perform a variety of functions, including the functions of the various embodiments described above. In some devices, multiple processors can be provided, such as one processor dedicated to wireless communication functions and one processor dedicated to running other applications. Software applications can be stored in the internal memory before they are accessed and loaded into the processors. The processors can include internal memory sufficient to store the application software instructions. In many devices the internal memory can be a volatile or nonvolatile memory, such as flash memory, or a mixture of both. The memory can also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device and memory within the processors themselves. For instance, memory can be any non-transitory computer readable medium having computer readable instructions (e.g., computer program instructions) stored thereof that are executable by a processor.

The term "electronic device" used hereinafter refers to any or all of, handheld devices, mobile phones, wearable devices, personal data assistants (PDAs), tablet computers, smart books, palm-top computers, barcode readers, scanners, indicia readers, imagers, Radio-frequency identification (RFID readers or interrogators), vehicle-mounted computers, wearable barcode scanners, wearable indicia readers, a point of sale (POS) terminal, headset devices, programmable logic controllers (PLCs), programmable automation controllers (PACs), industrial computers, laptop computers, desktop computers, personal computers, and similar electronic devices equipped with at least a processor configured to perform the various operations described herein.

The various embodiments are described herein using the term "computing platform" or "master device" or "server" or "host system" used interchangeably for the purpose of brevity. The term "server" can be used herein to refer to any computing device or a distributed network of computing device capable of functioning as a server, such as a master exchange server, web server, mail server, document server, or any other type of server. A server can be a dedicated computing device or a computing device including a server module (e.g., running an application which can cause the computing device to operate as a server). A server module (e.g., server application) can be a full function server module, or a light or secondary server module (e.g., light or secondary server application) that is configured to provide synchronization services among the dynamic databases on computing devices. A light server or secondary server can be a slimmed-down version of server type functionality that can be implemented on a computing device, such as a smartphone, thereby enabling it to function as an Internet server (e.g., an enterprise e-mail server) only to the extent necessary to provide the functionality described herein.

In some example embodiments, the server can correspond to any of, an industrial computer, a cloud computing-based platform, an external computer, a standalone computing device, and/or the like. In some example embodiments, the master device or the computing platform can also refer to any of the electronic devices, as described herein. In some example embodiments, the server can include an access point or a gateway device that can be capable of communicating directly with one or more electronic devices and can also be capable of communicating (either directly or indirectly via a communication network such as the Internet) with a network establishment service (e.g. Internet service provider). In some example embodiments, the server can manage the deployment of one or more electronic devices throughout a physical environment. In some example embodiments, the server can refer to a network establishment service including distributed systems where multiple operations are performed by utilizing multiple computing resources deployed over a network and/or a cloud-based platform or cloud-based services, such as any of a software-based service (SaaS), infrastructure-based service (IaaS) or platform-based service (PaaS) and/or like.

In some example embodiments, the term "server" can be used herein to refer to any one of or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, tablets, headsets, and smartwatches are generally collectively referred to as mobile devices.

The term "tote", "container", "bin", "basket", "crate", "pallet", in the present disclosure refers to a box like structure used for holding items, objects or parcels.

The components illustrated in the figures represent components that may or may not be present in various embodiments of the invention described herein such that embodiments can include fewer or more components than those shown in the figures while not departing from the scope of the invention.

Generally, in the material handling environment, it may be desirable to replenish the empty totes collected from a sorter or a conveyor system. For example, in distribution centers (D.C.) the totes are transported across various locations of the D.C. and hold items for conveying the items from one location to another location. Gathering of totes and distribution of totes is one of a major concern in the material handling environment. Few empty totes are dispensed from a sorter that may be present at a first location while other empty totes are dispensed from the conveyor system present at a second location different from the first location. Thus, collecting the empty totes from different sources and distributing the empty totes at different destination locations may be significantly affected if done manually. Further, employing conventional stationary tote stacker/de-stacker may not fulfil the need of transporting totes between different locations. Manual replenishment of the totes at discharge of chutes on the sorter or other machinery in a D.C. can be time consuming and laborious.

The current proposal describes a mobile unit or a vehicle capable of travelling across the D.C. to collect and distribute the totes at various locations. A stacking and de-stacking module may be employed in an automated vehicle such as AGVs or AMRs, for performing stacking and de-stacking of totes. The vehicle automatically navigates throughout the material handling environment to collect the empty totes from one or more locations. Further, the vehicle travels through the environment to distribute the totes to different locations.

The system can include an AGV or an AMR equipped with the stacking and det-stacking module. The operation of the AGV may be controlled by a server or a warehouse management system that might be in communication with the AGV. The stacking and de-stacking module switches between the mode of operation and thus, allows the AGV to perform stacking and de-stacking of totes.

In a stacking mode of operation, the AGV travels to a source location to collect the empty totes and create a stack. In some embodiment, the empty tote collection may not limit to just one location, i.e. the source location. But, the AGV may travel to different locations within the D.C. to collect the empty totes and create the stack of totes.

In a de-stacking mode of operation, the AGV picks up the totes from the stack and dispense the totes to a destined location. The term destined location must not be limited to just one location. In some embodiment, the AGV may travel to different locations within the D.C. to distribute the stacked totes.

Figure 1:
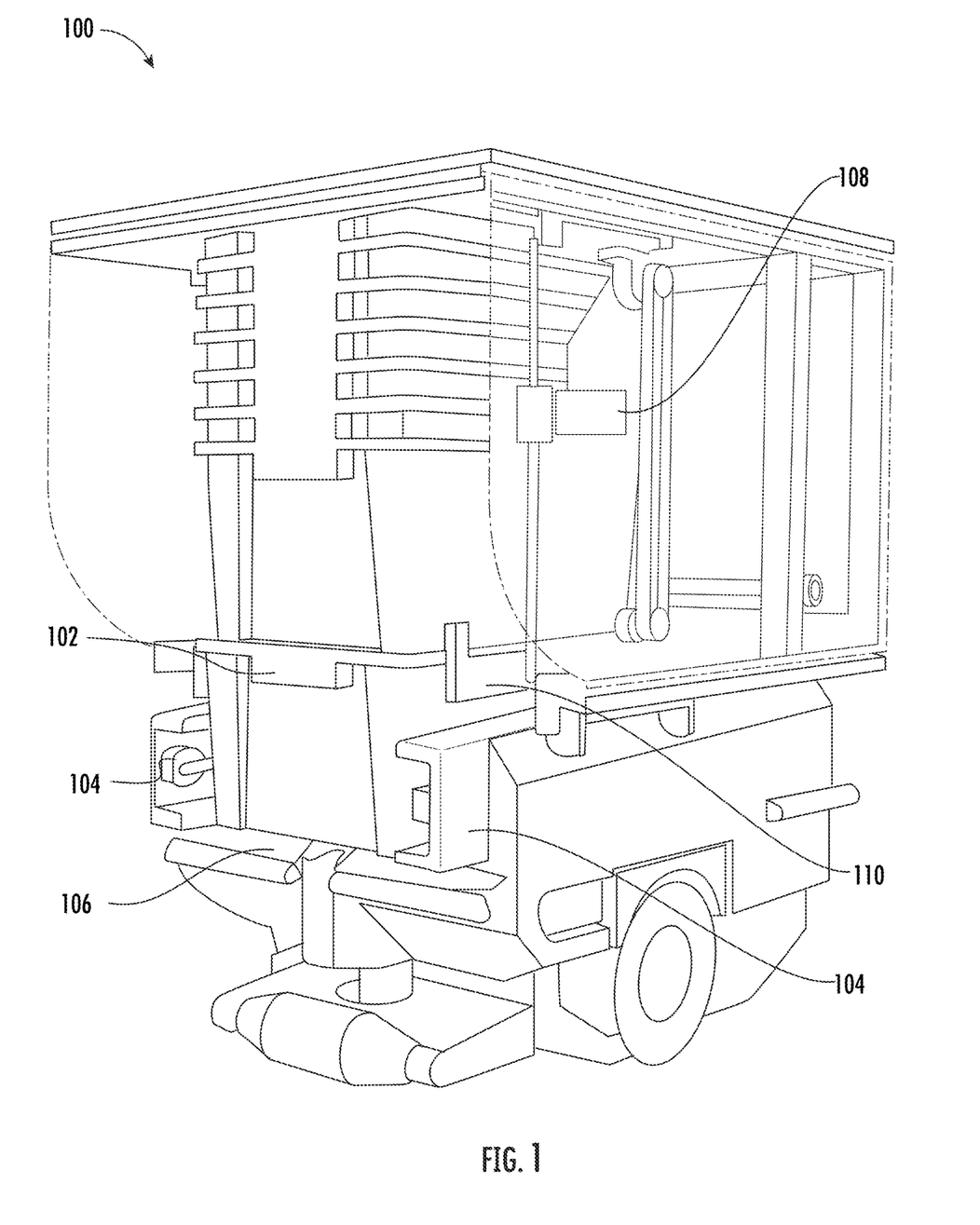
FIG. 1 illustrates a perspective view of a robotic system for stacking and de-stacking of totes, in accordance with an example embodiment described herein.

FIG. 1 illustrates a perspective view of a robotic system, for example, a mobile unit 100, in accordance with an example embodiment described herein. The mobile unit 100 may be an AGV, an AMR or any other robotic vehicle. The mobile unit 100 can correspond to any of the AGV/AMR comprising a processor (not shown) for controlling the operation of the parts of the mobile unit 100. The mobile unit 100 may navigate through a warehouse to perform the operation of collecting and distributing the totes 102. The navigation of the mobile unit 100 may be automatic along a defined path or can be manually-driven. The processor of the mobile unit 100 may communicate with a server or a host computer via a network for an operation (for example, a tote picking operation) and motion of the mobile unit 100.

In this regard, the network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the network may include a cellular telephone, an 802.11, 802.16, 802.20, and/or WiMax network. Further, the network may include a public network, such as the Internet, a private network, such as an intranet, or combinations thereof, and may utilize a variety of networking protocols now available or later developed including, but not limited to TCP/IP based networking protocols. In some examples, the network can correspond to a network in which the plurality of electronic devices can communicate with each other using other various wired and wireless communication protocols such as Transmission Control Protocol and Internet Protocol (TCP/IP), User Datagram Protocol (UDP), and 2G, 3G, 4G, or 5G communication protocols. In some examples, the network can correspond to any communication network such as, but not limited to, LORA, cellular (NB IoT, LTE-M, Leaky Feeder Coax, etc.)

The host computer may be located at one facility or may be distributed at geographically distinct facilities. Furthermore, the host computer may include a proxy server. Therefore, the host computer is not limited in scope to a specific configuration. The host computer may run one or more software programs for handling a particular task or set of tasks, such as inventory and warehouse management systems (which are available in various commercial forms). The host computer may include a Warehouse Management System (WMS), a database, and a web application to facilitate the operation of the mobile unit 100. The host system may issue instructions or provide directions for the operation of the mobile unit 100. The instructions may comprise navigation instructions, mode switching instructions, picking instructions, dispensing instructions, etc.

Illustratively, the mobile unit 100 may include a telescopic platform 104 having a flat surface 106. The flat surface 106 may support a plurality of totes 102 placed thereon. The flat surface 106 may act as a base for the telescopic platform 104 for supporting the plurality of totes 102. The telescopic platform 104 may be mounted on a base of the mobile unit 100 and configured to move in inward and outward direction along a conveying direction 212 (shown in FIG. 2).

The mobile unit 100 further includes a lifting apparatus 108 mounted on at least one side of the mobile unit 100 perpendicular to the flat surface 106. The lifting apparatus 108 can be any mechanism capable of making a vertical motion perpendicular to the flat surface 106. In some examples, the lifting apparatus 108 may move in vertical upward and downward direction relative to the flat surface 106 depending upon a signal received by the processor (not shown) of the mobile unit 100. The lifting apparatus 108 may be configured to lift the totes 102 in vertically upward direction. The lifting apparatus 108 may include one or more tote holders or finger-like structures (not shown) to grip the totes 102. Thus, the one or more tote holders may drop the totes 102 that had been lifted by the lifting apparatus 108.

The mobile unit 100 further includes a set of grippers 110 that are arranged on both sides of the mobile unit 100 and mounted above the telescopic platform 104. The set of grippers 110 may comprise any gripping mechanism such as suction cups (not shown) to grab and hold the totes 102 in position. The set of grippers 110 may grip and hold the totes 102 on the flat surface 106, thus, stopping the totes 102 from being lifted up by the lifting apparatus 108. This holding action of the set of grippers 110 depends upon a signal received by the processor (not shown) of the mobile unit 100.

In some embodiment, the telescopic platform 104, the lifting apparatus 108, and the set of grippers 110 may be activated by a pneumatic actuator or a drive motor controlled by the processor of the mobile unit 100.

Figure 2:
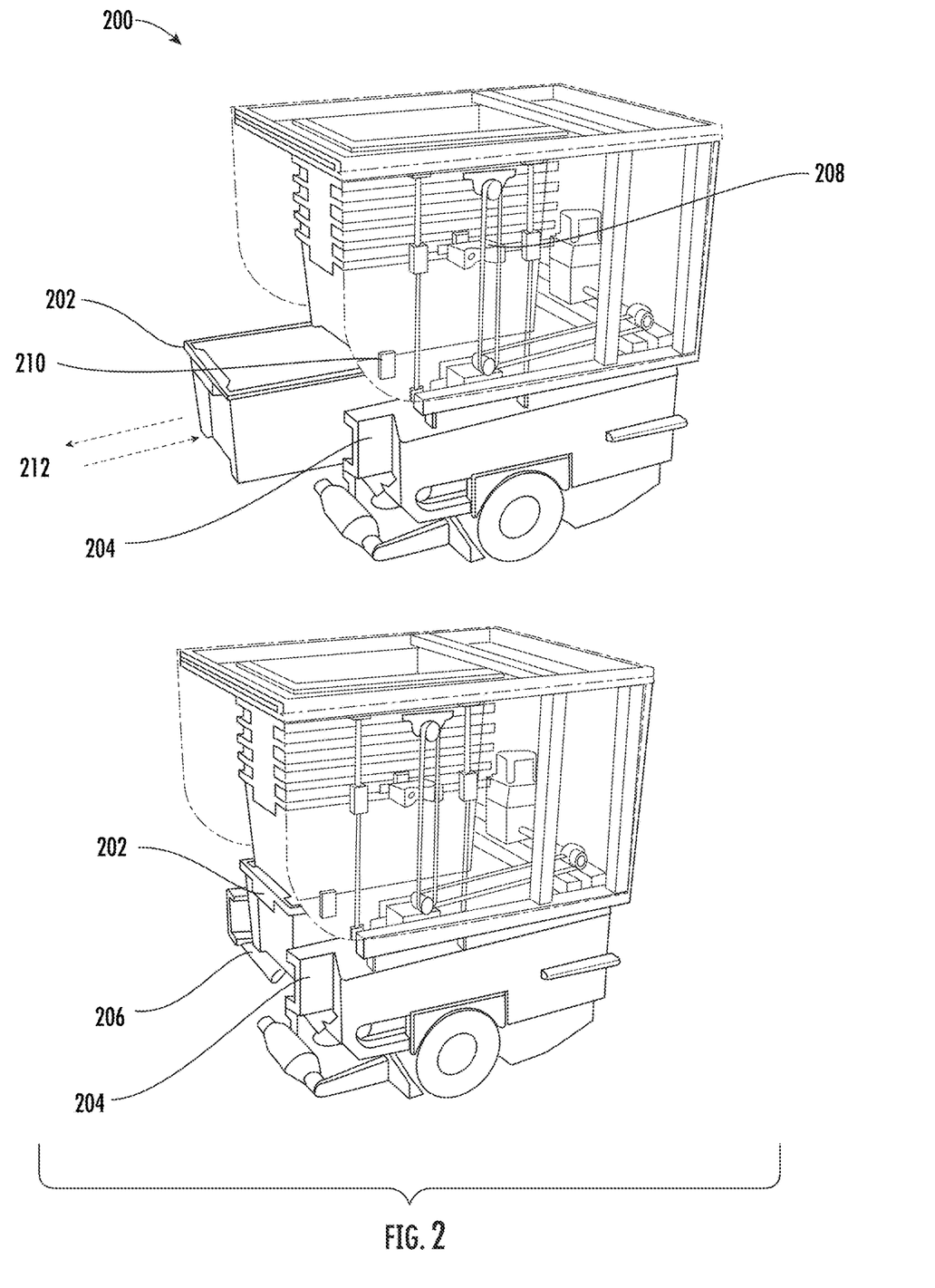
FIG. 2 illustrates a perspective view of a robotic system for performing the stacking of totes, in accordance with an example embodiment described herein.

Turning now to FIG. 2, illustrated is an exemplary embodiment of a mobile unit 200 performing a stacking operation, in accordance with an example embodiment. In one embodiment, the mobile unit 200 may receive instructions or commands from the host computer to operate in a stacking mode and navigate through various locations for picking up the totes. In the stacking mode, the mobile unit 200 travels to a first location to pick up a first tote 202 by the telescopic platform 204 and place it on the flat surface 206 of the telescopic platform 204. For picking the first tote 202, the telescopic platform 204 may extend outward along the conveying direction 212 to pick up the first tote 202 and then, rearward back in inward direction to place the first tote 202 on the flat surface 206. Similarly, the mobile unit 200 may receive instructions to go to a second location for picking a second tote. Again, the mobile unit 200 travels to the second location to pick up the second tote by the telescopic platform 204 and place it on the flat surface 206 of the telescopic platform 204. For picking the second tote, the telescopic platform 204 may extend outward along the conveying direction 212 to pick up the second tote and then, rearward back in inward direction to place the second tote on the flat surface 206.

When the first tote 202 is positioned on the flat surface 206 and the second tote is about to be picked up for stacking, the lifting apparatus 208 can lift the first tote 202 vertically up, thereby, making a space available on the flat surface 206 for positioning the second tote. When the second tote is picked up and placed on the flat surface 206, the one or more tote holders (not shown) of the lifting apparatus 208 drops the first tote 202 over the second tote. In this way, a stack of totes may be created on the flat surface 206. The stack herein may comprise the first tote 202 placed over the second tote such that a bottom surface of the first tote 202 abuts a top surface of the second tote. The stack of totes herein refers to a vertical arrangement of totes, in which totes are placed one over another. When a third tote is intended to be picked up from a third location, the stack of totes (comprising the first tote 202 placed over the second tote) may be lifted up by the lifting apparatus 208. When the third tote is picked up and placed on the flat surface 206, the one or more tote holders of the lifting apparatus 208 drops the stack of totes over the third tote, thus, adding the third tote in the stack of totes.

In yet another embodiment, the mobile unit 200 may receive the instructions or commands from the host computer to operate in the stacking mode and travel to a source location for picking up all the totes at once for stacking. However, the disclosure must not be limited to fixed location for stacking and de-stacking.

Figure 3:
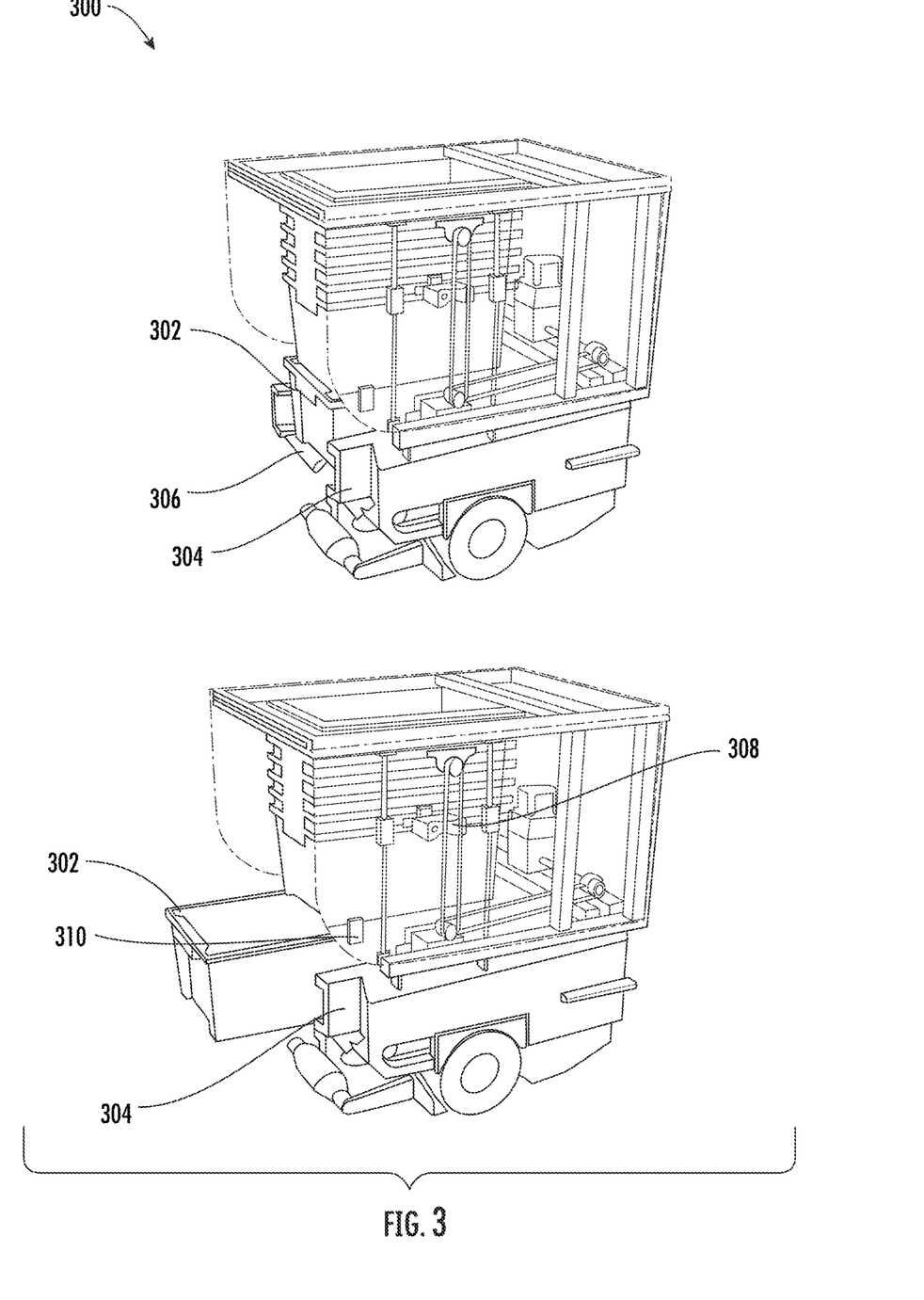
FIG. 3 illustrates a perspective view of a robotic system for performing the de-stacking of totes, in accordance with an example embodiment described herein.

Turning to FIG. 3, illustrated is an exemplary embodiment of a mobile unit 300 performing a de-stacking operation, in accordance with an example embodiment. In one embodiment, the mobile unit 300 may receive instructions or commands from the host computer to operate in a de-stacking mode and navigate through various locations for dispensing the stacked up totes. In the de-stacking mode, the mobile unit 300 may travel to a first location to dispense a first tote 302 from the stack of totes by the telescopic platform 304 and place it on the flat surface 306 of the telescopic platform 304. The first tote 302 may be dispensed by separating the first tote 302 from the stack of totes, the first tote 302 may be a lowermost tote of the stack of totes. The first tote may be separated from the stack of totes by lifting the stack of totes up by the lifting apparatus 308 while holding the first tote 302 on the flat surface 306 by the set of grippers 310. The first tote 302 may be separated by directing the set of grippers 310 to grab sides of the first tote 302 and hold the first tote 302 over the flat surface 306 so as to stop the first tote 302 from being lifted up by the lifting apparatus 308.

Further, the first tote 302 that may be held by the set of grippers 310 on the flat surface 306 may be dispensed out by the telescopic platform 304. The telescopic platform 304 may extend outward along the conveying direction 212 to dispense the first tote 302 and then, rearward back in inward direction to hold the second tote on the flat surface 306.

Similarly, the mobile unit 200 may receive instructions to go to a second location for dispensing a second tote. Again, the mobile unit 200 travels to the second location to dispense the second tote by the telescopic platform 304. The second tote may be dispensed by separating the second tote from the stack of totes, the second tote may be a current lowermost tote in the stack of totes. The second tote may be separated from the stack of totes by lifting the stack of totes up by the lifting apparatus 308 and holding the second tote on the flat surface 306 by the set of grippers 310. The second tote may be separated by directing the set of grippers 310 to grab sides of the second tote and hold the second tote over the flat surface 306 so as to stop the second tote from being lifted up by the lifting apparatus 308.

Thus, the second tote that may be separated from the stack and held by the set of grippers 310 on the flat surface 306 may be dispensed out by the telescopic platform 304. The telescopic platform 304 may extend outward along the conveying direction 212 to dispense the second tote and then, rearward back in inward direction to position a third tote from the stack of totes on the flat surface 306. The de-stacking of the totes may follow LIFO pattern, i.e., Last-in-first-out.

In yet another embodiment, the mobile unit 300 may receive the instructions or commands from the host computer to operate in the de-stacking mode and travel to one destination location for dispensing all the totes at once for de-stacking. However, the disclosure must not be limited to fixed location for stacking and de-stacking.

The stacking and de-stacking process as described earlier may not limited to one location. The mobile unit (100, 200, 300) may stack the totes from different locations and dispense the stacked totes at one destination location. In some embodiment, the mobile unit (100, 200, 300) may stack the totes from one source location and dispense the stacked totes at different destination locations. In another example scenario, the mobile unit (100, 200, 300) may stack the totes from multiple source locations and dispense the stacked totes at different destinations. In yet another non-limiting example, the mobile unit (100, 200, 300) may stack the totes from one source location and dispense the stacked totes at one destination.

Figure 4:
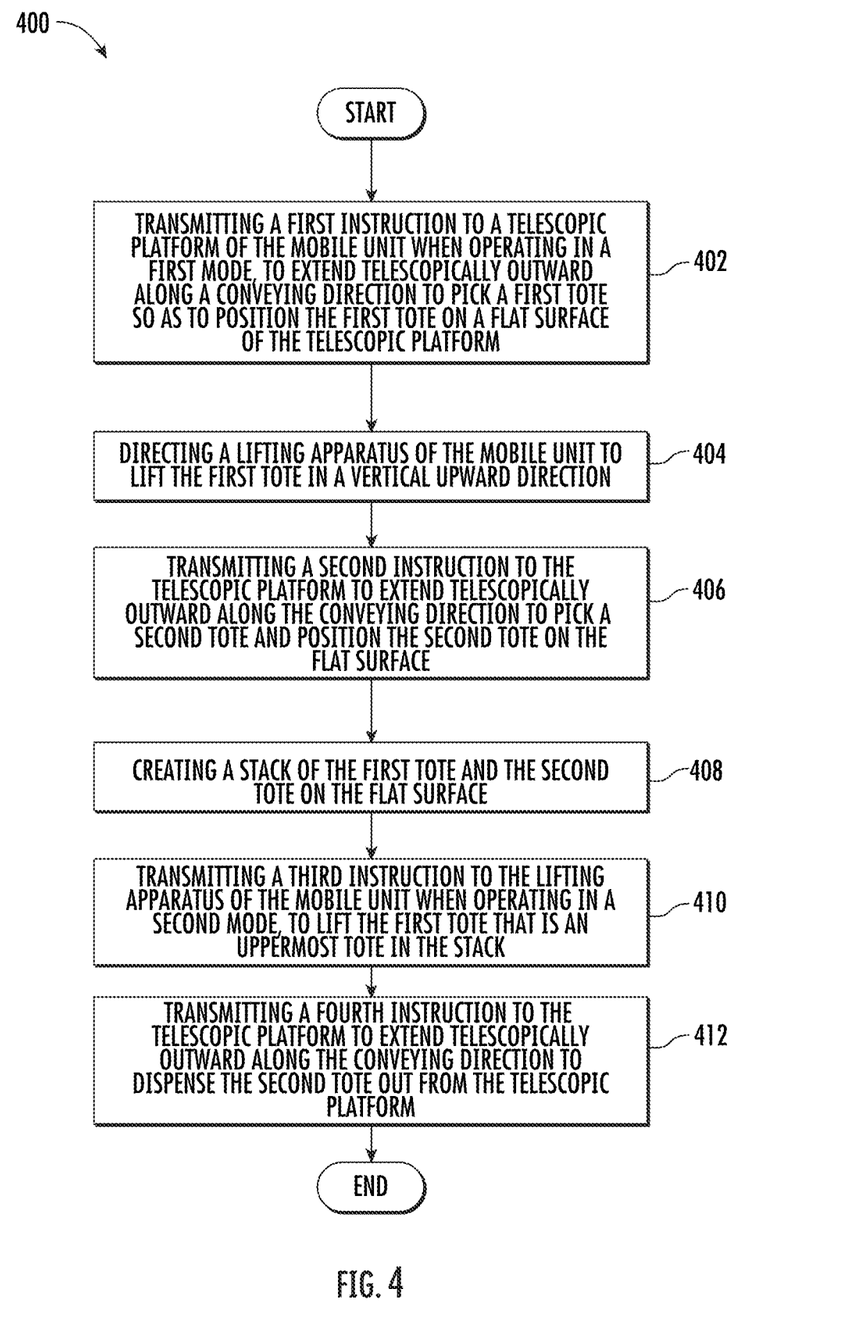
FIG. 4 shows a flowchart illustrating a method for controlling a mobile unit, according to an example embodiment.

Turning now to FIG. 4 that presents a flowchart illustrating a method for controlling a mobile unit 100, in accordance with an example embodiment described herein.

At step 402, the mobile unit 100 when operating in a first mode, i.e., a stacking mode, transmits a first instruction to the telescopic platform 104 to extend telescopically outward along the conveying direction 212 to pick up a first tote 102 so as to position the first tote 102 on the flat surface 106 of the telescopic platform 104. The mobile unit 100 may receive a first signal from the host computer or the server to operate in the stacking mode.

At step 404, the mobile unit 100 may direct the lifting apparatus 108 to lift the first tote 102 in a vertical up direction relative to the flat surface 106. Lifting of the first tote 102 makes the flat surface 106 available for next tote to be positioned thereon for stacking.

At step 406, the mobile unit 100 may receive a second signal from the host computer to collect a second tote. Thus, the mobile unit 100 then transmits a second instruction to the telescopic platform 104 to extend telescopically outward along the conveying direction 212 to pick up the second tote so as to position the second tote on the flat surface 106 of the telescopic platform 104. The mobile unit 100 may then drop the first tote 102 over the second tote that may be positioned on the flat surface 106. Further, the lifting apparatus may lift the stack comprising the first tote 102 and the second tote together. Lifting of the second tote makes the flat surface 106 available for next tote to be positioned thereon for stacking.

At step 408, the mobile unit 100 may create a stack of totes using collected totes. The stack, in this example, comprises of the first tote placed above the second tote. The second tote may be a lowermost totes in the stack of totes. The stack of totes may be created by dropping the first tote 102 over the second tote by the one or more tote holders of the lifting apparatus 108. In some embodiments, the stack of totes thus created may be placed on the flat surface 106.

At step 410, the mobile unit 100 may receive a third signal from the host computer to switch from the stacking mode to a de-stacking mode. The host system may direct the mobile unit 100 to initiate distribution of the stacked totes to the given locations. On receiving the switching signal from the host computer, the mobile unit 100 may then transmit a third instruction to the lifting apparatus 108 to lift the first tote 102 (from the flat surface 106) in the vertical upward direction. The first tote 102 herein corresponds to an upper most tote in the stack of totes. Since, the first tote 102 has been lifted up, the flat surface 106 then holds only the second tote.

At step 412, the mobile unit 100 may receive a fourth signal from the host computer to dispense the lower most tote, i.e. the second tote at the given location. The second tote may be held on the flat surface 106 of the telescopic platform 104 by the set of grippers 110 that stops the second tote from getting lifted up by the lifting apparatus 108. The mobile unit 100 then transmits a fourth instruction to the telescopic platform 104 to extend telescopically outward along the conveying direction 212 to dispense the second tote out from the telescopic platform 104.

Figure 5:
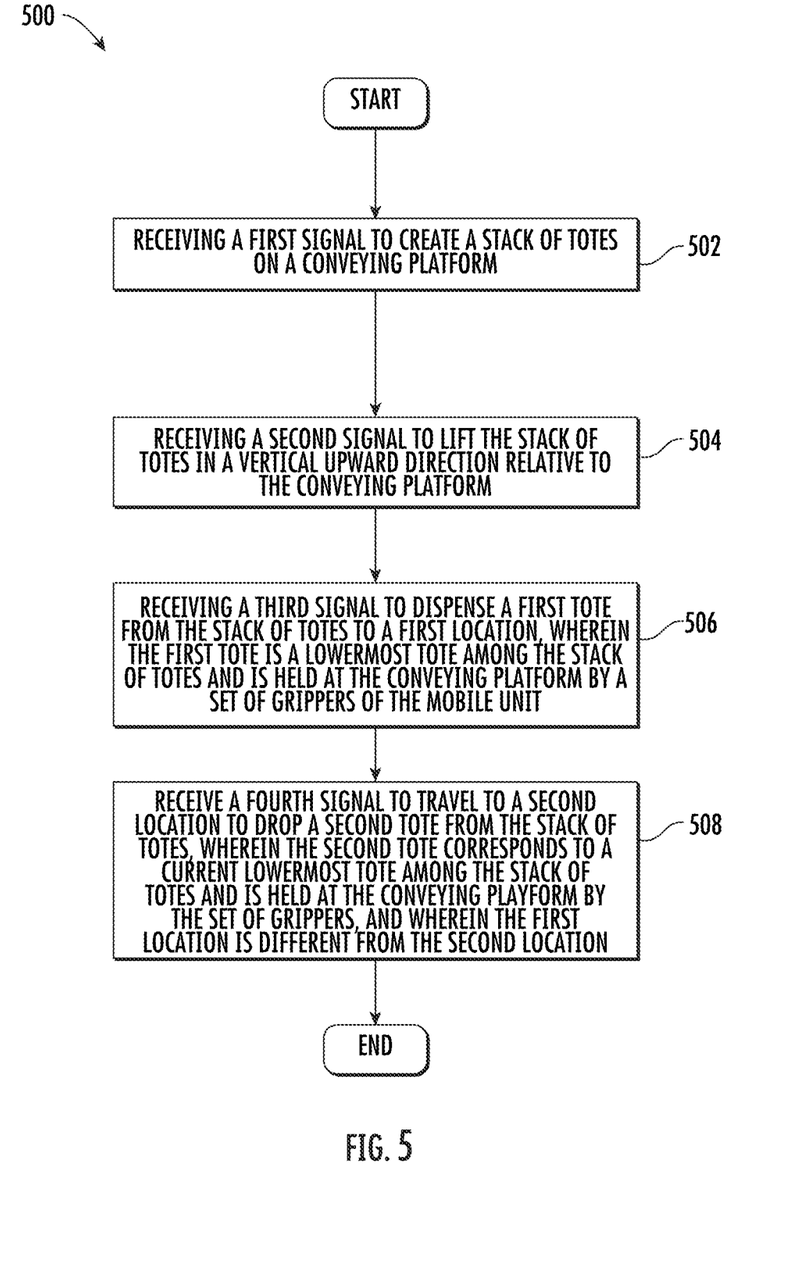
FIG. 5 shows a flowchart illustrating another method of operation of a mobile unit, according to an example embodiment.

Turning now to FIG. 5 that shows a flowchart illustrating another method of operation of a mobile unit 100 (or 200, 300), in accordance with an example embodiment described herein.

At step 502, the mobile unit 100 may receive a first signal from the host computer or a remote sever to create the stack of totes on a conveying platform. The conveying platform may be the flat surface (106, 206, 306) of the telescopic platform (104, 204, 304). The stacking of the totes is already described earlier.

At step 504, the mobile unit 100 may receive a second signal from the host computer to lift the stack of totes in the vertical upward direction relative to the conveying platform. This scenario has been depicted in first diagram of FIG. 3.

At step 506, the mobile unit 100 may receive a third signal to dispense the first tote 102 (in some example, 302) from the stack of totes to a first location. The first tote 102 may be a lowermost tote among the stack of totes and may be held at the conveying platform by the set of grippers 110 (or 310).

At step 508, the mobile unit 100 may receive a fourth signal to dispense the second tote from the stack of totes to a second location. The second tote may correspond to a current lowermost tote among the stack of totes and may be held at the conveying platform by the set of grippers 110. The first location may be distinct and physically distant from the second location.

Figure 6:
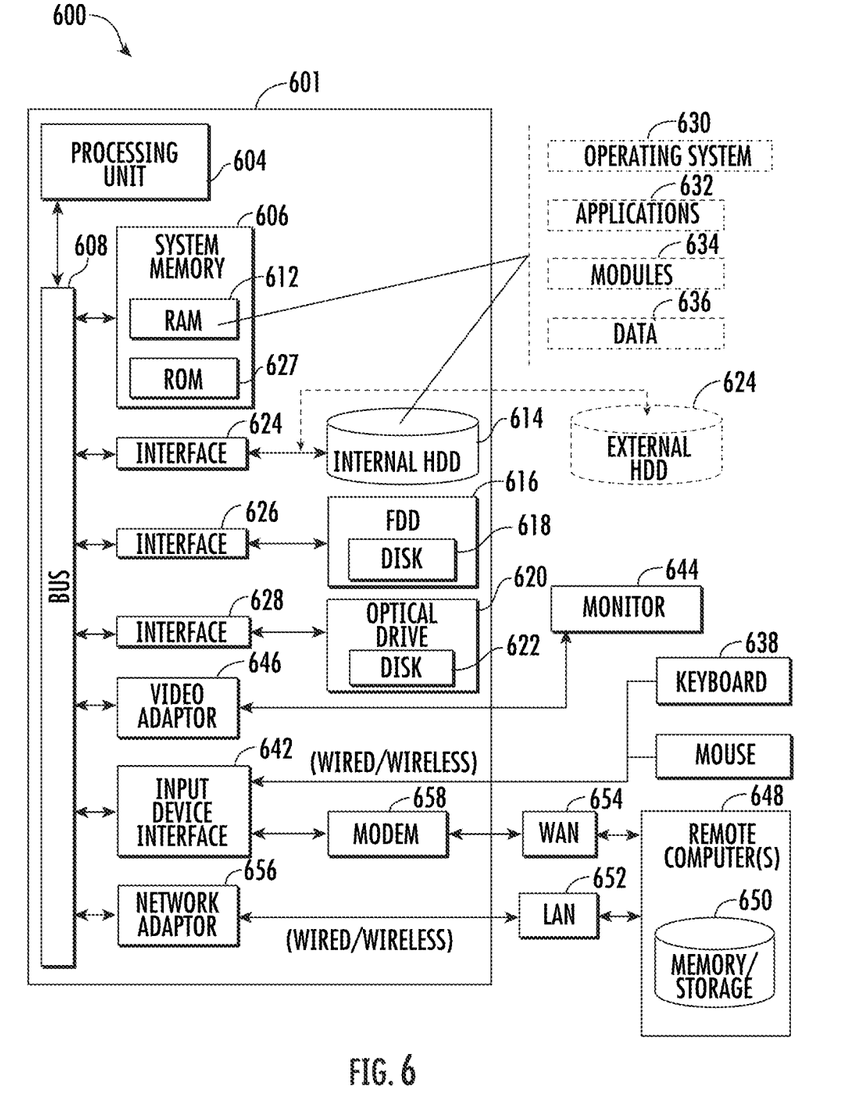
FIG. 6 illustrates a schematic view of an example computing device used along with a robotic system and/or a mobile unit, in accordance with an example embodiment described herein.

FIG. 6 illustrates a schematic view 600 of an example of an electronic device 601 e.g. the processor used along with the mobile unit 100, in accordance with another example embodiment described herein. In some example embodiments, the electronic device 601 can correspond to a computing device employed in the host computer or the server, as described in FIG. 1. In some example embodiments, one or more components of the electronic device 601 can be used to perform one or more operations.

Referring now to FIG. 6, there is illustrated a block diagram of operable to execute the functions and operations performed in the described example embodiments. In some example embodiments, the electronic device 601 can provide networking and communication capabilities between a wired or wireless communication network and a server and/or communication device. In order to provide additional context for various aspects thereof, FIG. 6 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

According to said example embodiments, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices. In accordance with some example embodiments, computing devices typically include a variety of media, which can include computer-readable storage media or communications media, which two terms are used herein differently from one another as follows.

According to some example embodiments, a computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

In some examples, communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 6, implementing various aspects described herein with regards to the electronic device 601 can comprise a processing unit 604, a system memory 606 and a system bus 608. The system bus 608 can be configured to couple system components including, but not limited to, the system memory 606 to the processing unit 604. In some example embodiments, the processing unit 604 can be any of various commercially available processors. To this end, in some examples, dual microprocessors and other multi-processor architectures can also be employed as the processing unit 604.

According to some example embodiments, the system bus 608 can be any of several types of bus structure that can further interconnect to a memory bus (with or without a memory controller), a peripheral bus, and a local bus using any of a variety of commercially available bus architectures. In some examples, the system memory 606 can comprise, read-only memory (ROM) 627 and random-access memory (RAM) 612. According to some example embodiments, a basic input/output system (BIOS) is stored in a non-volatile memory 627 such as ROM, EPROM, EEPROM, which BIOS contains the basic routines that help to transfer information between elements within the electronic device 601, such as during start-up. The RAM 612 can also comprise a high-speed RAM such as static RAM for caching data.

According to some example embodiments, the computing device 601 can further comprise an internal hard disk drive (HDD) 614 (e.g., EIDE, SATA), which internal hard disk drive 614 can also be configured for external use in a suitable chassis (not shown), a magnetic floppy disk drive (FDD) 618, (e.g., to read from or write to a removable diskette 616) and an optical disk drive 620, (e.g., reading a CD-ROM disk or, to read from or write to other high capacity optical media such as the DVD). In some examples, the hard disk drive 614, magnetic disk drive 622, and optical disk drive 620 can be connected to the system bus 608 by a hard disk drive interface 624, a magnetic disk drive interface 626 and an optical drive interface 628, respectively. According to some example embodiments, the interface 624 for external drive implementations can comprise, at least one or both of Universal Serial Bus (USB) and IEEE 1394 interface technologies. Other external drive connection technologies are within contemplation of the subject embodiments.

According to some example embodiments described herein, the drives and their associated computer-readable media provide nonvolatile storage of data, data structures, computer-executable instructions, and so forth. For the electronic device 601 the drives and media accommodate the storage of any data in a suitable digital format. Although the description of computer-readable media above refers to a HDD, a removable magnetic diskette, and a removable optical media such as a CD or DVD, it can be appreciated by those skilled in the art that other types of media which are readable by an electronic device 601, such as zip drives, magnetic cassettes, flash memory cards, cartridges, and the like, can also be used in the example operating environment, and further, that any such media can contain computer-executable instructions for performing the methods of the disclosed embodiments.

In some example embodiments, a number of program modules can be stored in the drives and RAM 612, including an operating system 630, one or more application programs 632, other program modules 634 and program data 636. To this end, in some examples, all or portions of the operating system, applications, modules, and/or data can also be cached in the RAM 612. It is to be appreciated that the various embodiments can be implemented with various commercially available operating systems or combinations of operating systems.

According to some example embodiments, a user can enter commands and information into the computing device 601 through one or more wired/wireless input devices, e.g., a keyboard 638 and a pointing device, such as a mouse 640. Other input devices (not shown) can include a microphone, an IR remote control, a joystick, a game pad, a stylus pen, touch screen, or the like. In some examples, these and other input devices are often connected to the processing unit 604 through an input device interface 642 that is coupled to the system bus 608, but can be connected by other interfaces, such as a parallel port, an IEEE 1364 serial port, a game port, a USB port, an IR interface, etc.

According to some example embodiments, a monitor 644 or other type of display device can also be connected to the system bus 608 through an interface, such as a video adapter 646. In addition to the monitor 644, the computing device 601 can also comprise other peripheral output devices (not shown), such as speakers, printers, etc.

According to some example embodiments, the computing device 601 can operate in a networked environment using logical connections by wired and/or wireless communications to one or more remote computers, such as a remote computer(s) 648. In some examples, the remote computer(s) 648 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 650 is illustrated. According to some example embodiments, the logical connections depicted include wired/wireless connectivity to a local area network (LAN) 652 and/or larger networks, e.g., a wide area network (WAN) 654. Such LAN and WAN networking environments are commonplace in offices and companies, and facilitate enterprise-wide computer networks, such as intranets, all of which can connect to a global communications network, e.g., the Internet.

In some examples, when used in a LAN networking environment, the computing device 601 can be connected to the LAN 652 through a wired and/or wireless communication network interface or adapter 656. The adapter 656 can facilitate wired or wireless communication to the LAN 652, which can also include a wireless access point disposed thereon for communicating with the wireless adapter 656.

In alternate examples, when used in a WAN networking environment, the computing device 601 can include a modem 658, or can be connected to a communications server on the WAN 654 or has other means for establishing communications over the WAN 654, such as by way of the Internet. The modem 658, which can be internal or external and a wired or wireless device, is connected to the system bus 608 through the input device interface 642. In a networked environment, program modules depicted relative to the computer, or portions thereof, can be stored in the remote memory/storage device 650. It will be appreciated that the network connections shown are exemplary and other means of establishing a communications link between the computers can be used.

According to some example embodiments, the computing device 601 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can further comprise at least Wi-Fi and Bluetooth™ wireless technologies. Thus, the communication can be a predefined structure as with a conventional network or simply an ad hoc communication between at least two devices.

In accordance with some example embodiments, Wi-Fi, or Wireless Fidelity, allows connection to the Internet from a couch at home, a bed in a hotel room, or a conference room at work, without wires. To this end, Wi-Fi referred herein, is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. Further, in accordance with some example embodiments described herein, a Wi-Fi network can be used to connect computers or the plurality of electronic devices to each other, to the Internet, and to wired networks (which use IEEE1102.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "9BaseT" wired Ethernet networks used in many offices.

In some example embodiments, certain ones of the operations herein can be modified or further amplified as described below. Moreover, in some embodiments additional optional operations can also be included. It should be appreciated that each of the modifications, optional additions or amplifications described herein can be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, some steps or methods can be performed by circuitry that is specific to a given function.

In one or more exemplary aspects, the functions described can be implemented in hardware, software, firmware, or any combination thereof. If implemented in software, the functions can be stored as one or more instructions or code on a non-transitory computer-readable medium or non-transitory processor-readable medium. The steps of a method or algorithm disclosed herein can be embodied in a processor-executable software module (or processor-executable instructions) which can reside on a non-transitory computer-readable or processor-readable storage medium. Non-transitory computer-readable or processor-readable storage media can be any storage media that can be accessed by a computer or a processor. By way of example but not limitation, such non-transitory computer-readable or processor-readable media can include RAM, ROM, EEPROM, FLASH memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm can reside as one or any combination or set of codes and/or instructions on a non-transitory processor-readable medium and/or computer-readable medium, which can be incorporated into a computer program product.

While various embodiments in accordance with the principles disclosed herein have been shown and described above, modifications thereof can be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above can relate to specific embodiments but shall not limit the application of such issued claims to processes and structures accomplishing any or all of the above advantages or having any or all of the above features.

In addition, the section headings used herein are provided for consistency with the suggestions under 37 C.F.R. 1.77 or to otherwise provide organizational cues. These headings shall not limit or characterize the invention(s) set out in any claims that can issue from this disclosure. For instance, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions can be set forth according to the limitations of the multiple claims issuing from this disclosure, and such claims accordingly define the invention(s), and their equivalents, that are protected thereby. In all instances, the scope of the claims shall be considered on their own merits in light of this disclosure but should not be constrained by the headings set forth herein.

Also, techniques, systems, subsystems, and methods described and illustrated in the various embodiments as discrete or separate can be combined or integrated with other systems, modules, techniques, or methods without departing from the scope of the present disclosure. Other items shown or discussed as directly coupled or communicating with each other can be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. For example, the various elements or components can be combined or integrated in another system or certain features can be omitted or not implemented. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

As will be appreciated, any such computer program instructions and/or other type of code can be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of a local or networked system and/or circuitry. In some embodiments, one or more external systems (such as a remote cloud computing and/or data storage system) can also be leveraged to provide at least some of the functionality discussed herein.

As described above and as will be appreciated based on this disclosure, embodiments of the present invention can be configured as methods, personal computers, servers, mobile devices, backend network devices, and the like. Accordingly, embodiments can comprise various means including entirely of hardware or any combination of software and hardware. Furthermore, embodiments can take the form of a computer program product on at least one non-transitory computer-readable storage medium having computer-readable program instructions (e.g., computer software) embodied in the storage medium. Any suitable computer-readable storage medium can be utilized including non-transitory hard disks, CD-ROMs, flash memory, optical storage devices, or magnetic storage devices.

References within the specification to "one embodiment," "an embodiment," "embodiments", or "one or more embodiments" are intended to indicate that a particular feature, structure, or characteristic described in connection with the embodiment is comprised in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Detailed embodiments are disclosed herein; however, it is to be understood that the disclosed embodiments are merely exemplary, which may be embodied in various forms. Therefore, specific structural and functional details disclosed herein are not to be interpreted as limiting, but merely as a basis for the claims.

While it is apparent that the illustrative embodiments described herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. An apparatus comprising:
   a telescopic platform comprising a flat surface to support a plurality of totes positioned thereon;
   a lifting apparatus configured to lift the plurality of totes in a vertical direction relative to the flat surface of the telescopic platform;
   a set of grippers configured to grip and hold at least one tote among the plurality of totes on the flat surface; and
   a processor configured to operate in one or more modes of operation and control operations of the telescopic platform and the lifting apparatus, wherein the processor is further configured to:
      in a first mode, transmit a first instruction to the telescopic platform to extend telescopically outward along a conveying direction to pick a first tote so as to position the first tote on the flat surface;
      direct the lifting apparatus to lift the first tote in a vertical upward direction;
      transmit a second instruction to the telescopic platform to extend telescopically outward along the conveying direction to pick a second tote and position the second tote on the flat surface; and
      create a stack of the plurality of totes on the flat surface, wherein the first mode corresponds to a tote stacking mode, wherein in the tote stacking mode, the stack of the first tote and the second tote is created based on directing the lifting apparatus to drop the first tote over the second tote, and wherein the stack comprises the first tote placed over the second tote such that a bottom surface of the first tote abuts a top surface of the second tote.

2. The apparatus of claim 1, wherein the processor is further configured to control operations of the set of grippers, wherein the processor is further configured to:
   in a second mode, transmit a third instruction to the lifting apparatus to lift the first tote that is one tote above a lowermost tote in the stack of the plurality of totes; and
   transmit a fourth instruction to the telescopic platform to extend telescopically outward along the conveying direction to dispense the second tote out from the telescopic platform.

3. The apparatus of claim 2, wherein the second mode corresponds to a tote de-stacking mode.

4. The apparatus of claim 3, wherein in the tote de-stacking mode, the second tote is dispensed out by separating the second tote from the stack, wherein the second tote is separated by directing the set of grippers to grab sides of the second tote and hold the second tote over the flat surface so as to stop the second tote from being lifted up by the lifting apparatus.

5. The apparatus of claim 3, wherein the processor is further configured to:
   receive a switching signal from a server in communication with the processor; and
   in response of receiving the switching signal, switch the mode of operation from the first mode to the second mode, wherein the second mode is different from the first mode.

6. The apparatus of claim 5, wherein the server communicates with the processor via at least one of a wireless link or a wired connection.

7. The apparatus of claim 2, wherein the telescopic platform is mounted on a base of a mobile unit and is configured to move in inward and outward direction along the conveying direction.

8. A mobile unit comprising at least one processor and at least one non-transitory memory comprising a computer program code, the at least one non-transitory memory and the computer program code configured to, with the at least one processor, cause the mobile unit to:
   receive a first signal to create a stack of totes on a conveying platform;
   receive a second signal to lift the stack of totes in a vertical upward direction relative to the conveying platform;
   receive a third signal to dispense a first tote from the stack of totes to a first location, wherein the first tote is a lowermost tote among the stack of totes and is held at the conveying platform by a set of grippers of the mobile unit; and
   receive a fourth signal to travel to a second location to drop a second tote from the stack of totes, wherein the second tote corresponds to a current lowermost tote among the stack of totes and is held at the conveying platform by the set of grippers, and wherein the first location is different from the second location.

9. The mobile unit of claim 8, wherein the first tote is held at the conveying platform by the set of grippers that are configured to grip the first tote so as to stop the first tote from being lifted up in the vertical upward direction by a lifting apparatus.

10. The mobile unit of claim 8, wherein the first signal, the second signal, the third signal and the fourth signal are received from a server that is in communication with the mobile unit.

11. The mobile unit of claim 8, wherein the at least one non-transitory memory and the computer program code configured to, with the at least one processor, cause the mobile unit to further:
   receive the stack of totes from a source location, wherein the stack of totes comprises a vertically arranged set of totes and the source location pertains to a location where empty totes are accumulated for replenishment.

12. The mobile unit of claim 8, wherein the first location for dispensing the first tote and the second location for dispensing the second tote is determined by a server or a remote management system.

13. The mobile unit of claim 8, wherein the mobile unit is at least one of an automated guided vehicle (AGV), an autonomous mobile robot (AMR), or a robotic module.

14. A method for controlling a mobile unit, comprising:
   transmitting a first instruction to a telescopic platform of the mobile unit when operating in a first mode, to extend telescopically outward along a conveying direction to pick a first tote so as to position the first tote on a flat surface of the telescopic platform;

directing a lifting apparatus of the mobile unit to lift the first tote in a vertical upward direction;

transmitting a second instruction to the telescopic platform to extend telescopically outward along the conveying direction to pick a second tote and position the second tote on the flat surface;

creating a stack of the first tote and the second tote on the flat surface;

transmitting a third instruction to the lifting apparatus of the mobile unit when operating in a second mode, to lift the first tote that is an uppermost tote in the stack; and transmitting a fourth instruction to the telescopic platform to extend telescopically outward along the conveying direction to dispense the second tote out from the telescopic platform, wherein the first mode corresponds to a tote stacking mode, wherein in the tote stacking mode, the stack of the first tote and the second tote is created based on directing the lifting apparatus to drop the first tote over the second tote, and wherein the stack comprises the first tote placed over the second tote such that a bottom surface of the first tote abuts a top surface of the second tote.

15. The method of claim 14, wherein the second mode corresponds to a tote de-stacking mode.

16. The method of claim 14, further comprising:
receiving a switching signal from a server in communication with the mobile unit; and
in response of receiving the switching signal, switching a mode of operation from the first mode to the second mode, wherein the second mode is different from the first mode.

17. The method of claim 15, wherein in the tote de-stacking mode, the second tote is dispensed by separating the second tote from the stack, wherein the second tote is separated by directing a set of grippers to grab sides of the second tote and hold the second tote over the flat surface so as to stop the second tote from being lifted up by the lifting apparatus.

* * * * *